July 10, 1951     J. S. ALSPAUGH     2,559,923

TRANSMISSION

Filed Feb. 9, 1949

INVENTOR.
James S. Alspaugh
BY
McCrady & Wilson
ATTORNEYS.

Patented July 10, 1951

2,559,923

UNITED STATES PATENT OFFICE 2,559,923

TRANSMISSION

James Shellenbarger Alspaugh, Portsmouth, Ohio

Application February 9, 1949, Serial No. 75,393

2 Claims. (Cl. 74—752)

This invention relates to transmissions, and more particularly to transmissions of the infinitely variable type capable of transmitting power at reduced speed accompanied by a corresponding increase in torque.

In the operation of motor vehicles it is necessary that the power delivered by the engine or prime mover be applied to the driving wheels in such a manner that high torque is available for starting the vehicle, and that the speed ratio be increased, accompanied by a corresponding reduction in the torque ratio as the vehicle operates at higher speeds. Many attempts have been made to overcome these problems, but the majority of such attempts have been unsatisfactory because of the complexity of the mechanisms employed.

An object of my invention is to provide a simplified mechanical transmission capable of automatically varying the speed and torque ratio between driving and driven shafts dependent on the ratio between the power applied to the driving shaft and the load to which the driven shaft is subjected to provide the most efficient drive of the driven shaft.

Another object of my invention resides in the provision of a mechanical transmission having oppositely disposed controlled gear trains interposed between driving and driven shafts to transmit torque to the driven shaft at a speed ratio dependent on the relation of the load to which the driven shaft is subjected and the power applied to the driving shaft.

A further object of the invention is to provide an improved transmission wherein a gear train carrier is provided with oppositely disposed and driven shafts and controlled by a sun gear engaging said sets of gears, and held by the driven shaft.

Yet another object of this invention is to provide a transmission wherein the speed and torque ratios between driving and driven shafts are automatically varied in response to variations between the load to which the driven shaft is subjected and the power applied to the driving shaft by two intermediate drives.

Still a further object of the invention resides in the provision of an automatic transmission wherein a manually actuated lever is provided to select forward or reverse drive, and the speed and torque ratios of the drive between the driving and driven shafts are automatically determined by the ratio between the load to which the driven shaft is subjected and the torque exerted on the driving shaft.

Another object is to provide a simplified infinitely variable mechanical transmission that can be manufactured economically, and which is of rugged construction to insure trouble free service.

Other objects and advantages of this invention will appear in the following description and appended claims, reference being had to the accompanying drawing forming a part of the specification.

Figure 1:
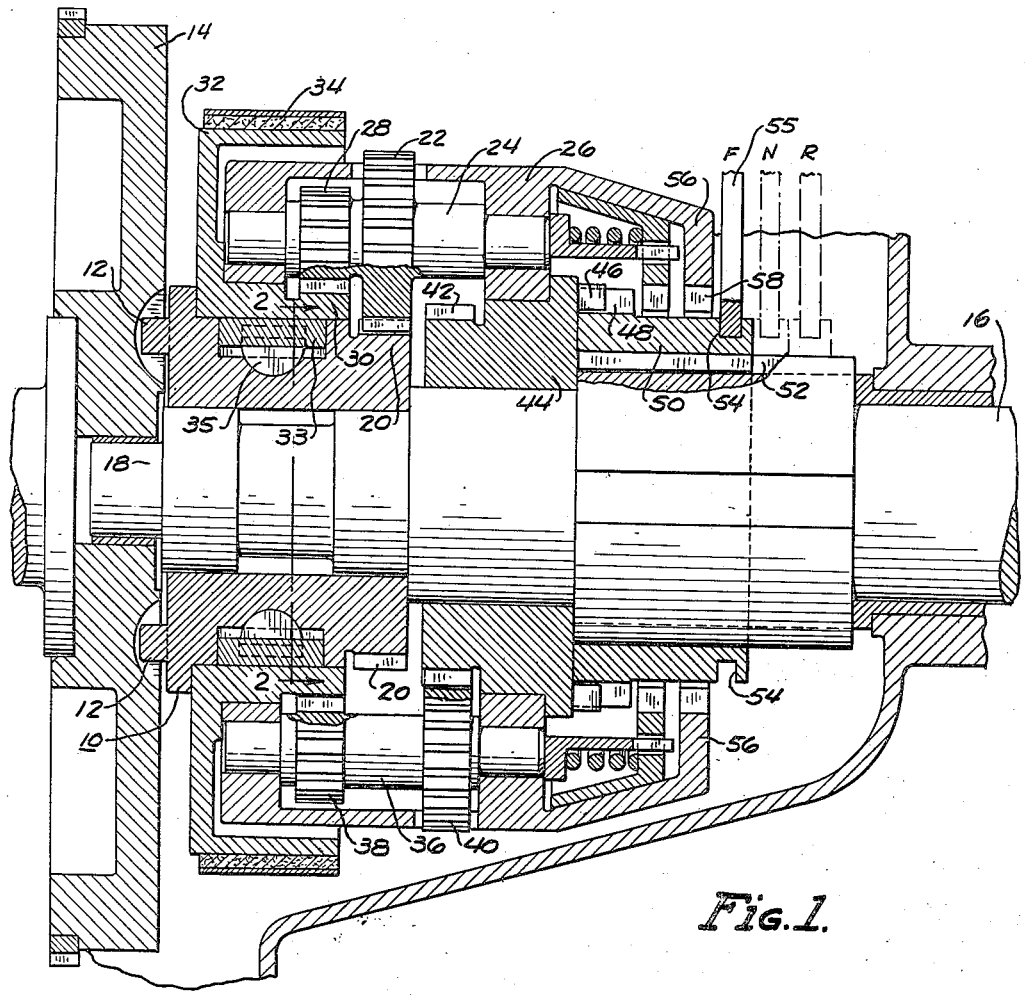
Fig. 1 is a longitudinal sectional view taken at right angles through a transmission constructed in accordance with my invention.
Figure 2:
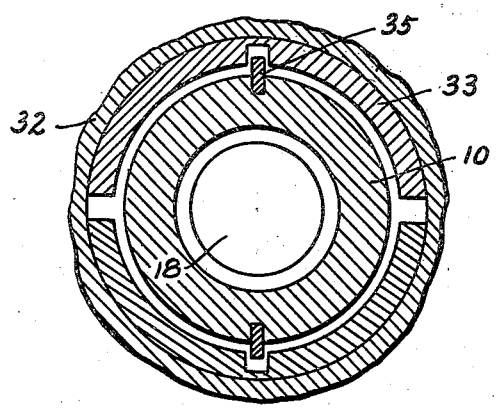
Fig. 2 is a sectional view taken substantially on the line 2—2 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to the drawing, it will be noted that the invention is illustrated as embodied in a transmission having a driving member 10 secured in any convenient manner as by axially extending lugs 12 to a flywheel 14 of an engine or other prime mover. A driven shaft 16 has its forward end 18 journalled in the flywheel 14.

The driving member 10 is provided with a sun gear 20 meshing with a pinion 22 secured to a spindle 24 rotatably mounted in a carrier 26 concentrically mounted on the driving and driven shafts 10 and 16. The spindle 24 is provided with another pinion 28, preferably of smaller diameter than the pinion 22. The pinion 28 engages a transfer sun gear 30 rotatably mounted on the driving member 10, and having a drum 32 secured thereto and adapted to be engaged by a brake band 34 to lock the transfer sun gear 30 against rotation. Any suitable means may of course by employed to actuate the brake band 34. A centrifugally actuated stabilizing clutch 33 having a plurality of radially movable segments mounted on keys 35 carried by the driving member 10 is provided to exert a restraining force on the sun gear 30.

The carrier 26 is provided with another set of preferably equally spaced spindles 36, alternately spaced with reference to the spindles 24. Each of the spindles 36 has a pinion gear 38 meshing with the sun gear 30 in such a manner as to be driven thereby. Each spindle 36 also has a pinion gear 40, preferably of larger diameter than the pinion gear 38, and meshing with a sun gear 42 carried by a member 44 rotatably mounted on the driven shaft 16. The member 44 is provided with axially extending jaw teeth 46 adapted to be engaged by similarly spaced teeth 48 of a coupler 50 slidably mounted on splines 52 formed on the driven shaft 16.

The coupler 50 is provided with an annular groove 54 to receive a shifter fork 55 whereby the coupler 50 may be shifted axially on the driven shaft 16 from neutral to forward and reverse drive positions, indicated by the letters F, N and R.

The carrier 26 terminates in an inwardly directed flange 56 having jaw teeth 58 adapted to engage the teeth 48 formed on the coupler 50 to provide a reverse drive when the brake band 34 is activated to lock the sun gear 30 against rotation, and the shifter fork 55 is shifted to the R position.

The operation is as follows. To effect a forward drive the shifter fork 55 controlling the sleeve 50 is moved toward the left as viewed in Fig. 1. The teeth 48 of the sleeve 50 disengage the teeth 61 of the brake 63, and engage the teeth 46 of the member 44 thereby locking the sun gear 42 to the driven shaft 16. The centrifugally actuated clutch 33 which clutches the transfer sun gear 30 to the driving sun gear 20 is released while the engine is rotating at slow speed. The brake 34 having already been released renders the sun gear 30 free to revolve when the engine is idling.

The driving member 10 having the driving sun gear 20 fixed thereto is thus freed to rotate while the engine is idling at slow speeds. The driven shaft 16 being subjected to load does not revolve as the driving shaft 10 and the driving sun gear 20 are driven at engine idling or slow speeds. The carrier 26 is of course released from the driven shaft 16, and due to the pinion gears 40 and 38 carried by the spindles 36 and interconnecting the driven sun gear 42 and the transfer sun gear 30, is rotated reversely as torque applied from the driving member 10 and sun gear 20 is transmitted through pinions 22 fixed to the spindles 24 and the pinions 28 meshing with the sun gear 30 as the gear 20 is rotated forwardly by slow speed rotation of the engine.

The pinions 28 carried by the spindles 24 and meshing with the transfer sun gear 30 is rotated reversely but at a slower speed than the carrier 26 due to the difference in diameter of the gears 20 and 22 relative to the gears 28 and 30.

When the speed of the engine is increased the spaced members of the centrifugally actuated clutch 33 are moved radially outwardly to progressively engage the inner surface of the drum 32 having the sun gear 30 secured thereto. As the degree of engagement of the clutch 33 is increased the transfer sun gear 30 is progressively induced to rotate with the driving sun gear 20 and the driving member 10. As the engagement of the clutch becomes effective its clutching action is transmitted through the pinion gears 22 and 28 whereupon the reverse rotation of the sun gear 30 is progressively decreased. As the clutch 33 is progressively engaged due to centrifugal force exerted thereon as the speed of the engine and driving member 10 increases, the driven shaft 16 subjected to progressively increasing torque. When the torque thus exerted on the driven shaft 16 increases to such a point that it overcomes the load to which the driven shaft is subjected, the shaft 16 begins to rotate. The torque ratio between the driving member 10 and the driven shaft 16 is substantially inversely proportioned to the difference in speed between the driving member 10 and the driven shaft 16. The difference in speed between the members 10 and 16 is dependent on the degree of engagement of the clutch 33, which in turn is dependent on the ratio of the load to which the driven member 16 is subjected and the torque exerted on the driving member 10. The ratio of the drive between the driving member 10 and the driven shaft 16 is thus speed and torque responsive.

As the engine speeds up the centrifugally actuated clutch 33 progressively induces the sun gear 30 to approach the speed of the sun gear 20. The speed ratio of the driven shaft 16 relative to the driving member 10 is thus progressively increased whereupon the torque ratio of the drive is correspondingly decreased. When the degree of engagement of the clutch 33 increases to such a point that no slippage occurs between the sun gear 30 and the sun gear 20, the unit becomes locked up to provide a one to one drive between the driving member 10 and the driven shaft 16.

To effect a reverse drive the shifter fork 55 is shifted rearwardly as viewed in Fig. 1 to engage the teeth 48 of the coupler 50 with the teeth 58 carried by the flange 56 of the carrier 26 thereby connecting the carrier 26 to the driven shaft 16. The brake 34 is then engaged to lock the sun gear 30. The driving member 10 and driving sun gear 20 then drives the pinion gear 22 connected through the spindle 24 to the pinion gear 28. The pinion gear 28 rolls around the locked sun gear 30 to drive the carrier 26 and driven member 16 in the reverse direction.

I claim:

1. A gear train comprising a driving member having a sun gear, a transfer sun gear rotatably mounted on the driving member, a driven shaft having one of its ends journalled in the driving member, a sun gear rotatably mounted on the driven shaft, a carrier, two sets of pinion gear spindles journalled in the carrier, one set of said spindles having spaced pinion gears meshing with the driving member sun gear and with the transfer sun gear, respectively, the other set of said spindles having spaced pinion gears meshing with the transfer sun gear and with the sun gear mounted on the driven shaft, respectively, a coupler splined to and slidably mounted on the driven shaft and adapted to selectively lock the driven shaft to the sun gear mounted thereon or to the carrier, and a centrifugally operated clutch carried by the driving member to progressively clutch the transfer sun gear to rotate with the driving member sun gear to progressively initiate a drive from the driving member to the driven shaft, the speed ratio of the drive increasing to a one to one drive when the centrifugally operated clutch drives the transfer sun gear at a one to one ratio with the driving member sun gear.

2. In a gear train, a driving member, a sun gear fixed to the driving member, a driven shaft having one of its ends journalled in the driving member, a member rotatably mounted on the driven shaft and having a sun gear, a transfer sun gear rotatably mounted on the driving member, a carrier, two sets of pinion gear spindles journalled in the carrier, one set of said spindles having spaced pinion gears of different diameters meshing with the sun gear carried by the driving member and with the transfer sun gear, respectively, the other set of said spindles having spaced pinion gears of different diameters meshing with the transfer sun gear and with the sun gear carried by the member rotatably mounted on the driven shaft, respectively, a coupler splined to and slidably mounted on the driven shaft and adapted in a forward drive position to lock the driven shaft to the member rotatably mounted thereon and in a reverse drive position to lock the carrier to the driven shaft, a reverse drive brake to lock the transfer sun gear against rotation, and a centrifugally operated clutch carried by the driving member and adapted to engage the transfer sun gear to clutch the transfer sun gear to the sun gear fixed to the driving member to exert a drive on the driven shaft when the coupler is in the forward drive position.

JAMES SHELLENBARGER ALSPAUGH.

REFERENCES CITED

The following references are of record in the file of this patent:

UNITED STATES PATENTS

| Number | Name | Date |
|---|---|---|
| 2,118,423 | Timmerman | May 24, 1938 |
| 2,151,151 | Perez | Mar. 21, 1939 |